(12) United States Patent
Montell

(10) Patent No.: US 10,018,480 B2
(45) Date of Patent: Jul. 10, 2018

(54) POINT OF INTEREST SELECTION BASED ON A USER REQUEST

(71) Applicant: Google Inc., Mountain View, CA (US)

(72) Inventor: Brandon Jacob Montell, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/332,354

(22) Filed: Oct. 24, 2016

(65) Prior Publication Data

US 2018/0112996 A1    Apr. 26, 2018

(51) Int. Cl.
*G01C 21/36* (2006.01)
*G06N 7/00* (2006.01)
*G01C 21/00* (2006.01)

(52) U.S. Cl.
CPC ......... *G01C 21/3682* (2013.01); *G06N 7/005* (2013.01)

(58) Field of Classification Search
CPC ............ G01C 21/3682; G01C 21/3605; G06N 7/005; G06Q 30/0205
USPC ................................ 701/409, 410, 412, 426
See application file for complete search history.

(56) References Cited

U.S. PATENT DOCUMENTS

| | | | |
|---|---|---|---|
| 7,388,519 B1 | 6/2008 | Kreft | |
| 8,401,771 B2 | 3/2013 | Krumm et al. | |
| 8,566,029 B1 | 10/2013 | Lopatenko et al. | |
| 9,430,858 B1 | 8/2016 | Har et al. | |
| 9,699,375 B2* | 7/2017 | Fan | H04N 5/23229 |
| 2009/0210146 A1 | 8/2009 | Chen | |
| 2013/0061147 A1* | 3/2013 | Beaurepaire | G06F 3/011 |
| | | | 715/738 |
| 2014/0095510 A1 | 8/2014 | Lv et al. | |
| 2015/0169573 A1 | 6/2015 | Arora et al. | |

OTHER PUBLICATIONS

International Search Report for PCT/US2016/058414, dated May 2, 2017, 13 pages.

* cited by examiner

*Primary Examiner* — Gertrude Arthur Jeanglaude
(74) *Attorney, Agent, or Firm* — Dority & Manning, P.A.

(57) ABSTRACT

Systems and methods of providing geographic location data to a user are disclosed. For instance, data indicative of a request for location data associated with a geographic information system can be received. A set of location constraints can be determined based at least in part on a predefined probability scheme associated with one or more attributes associated with a plurality of points of interest associated with the geographic information system. A plurality of candidate points of interest can be identified from the plurality of points of interest, such that each candidate point of interest satisfies each constraint of the determined set of constraints. A point of interest can be selected for presentation to a user from the plurality of candidate points of interest. Data associated with the selected point of interest can be provided to a user device associated with the geographic information system.

20 Claims, 6 Drawing Sheets

POINT OF INTEREST SELECTION BASED ON A USER REQUEST

FIELD

The present disclosure relates generally to geographic information systems.

BACKGROUND

Geographic information systems provide for the archiving, retrieving, and manipulating of data that has been stored and indexed according to geographic coordinates of its elements. Geographic information systems and other services can allow a user to request geographic imagery associated with an object or location of interest. For instance, a user may request imagery associated with a particular store, location, landmark, etc. The geographic information system can provide geographic imagery depicting the object or location of interest in response to the request to the user.

Geographic information systems can offer imagery of geographic regions of interest in a variety of different formats and from a variety of different view perspectives. For instance, geographic imagery can be provided as map imagery, satellite imagery, aerial imagery, interactive panoramic imagery presented from a perspective at or near ground level, and other imagery. Certain geographic information systems or services can provide interactive three-dimensional representations of a geographic area. Users can navigate a virtual camera to view the three-dimensional representations from a plurality of different perspectives.

Users of geographic information systems may wish to view information associated with locations or points of interest. Many conventional geographic information systems require a specific query of a location and/or a manual navigation to the location for information associated with the location to be presented to the user. Various mapping services offer "random" location selection techniques that allow a location to be selected randomly and for information associated with the location to be presented to the user. However, such location selection techniques may not take into account potential user interest in a location when selecting the locations, and may select locations that are uninteresting or not noteworthy to a user. For instance, such location selection techniques may select the location based on a random selection of latitude, longitude coordinates. Further, such location selection techniques may unduly limit the potential locations that can be selected.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of determining geographic location data. The method includes receiving, by one or more computing devices, data indicative of a request for location data associated with a geographic information system. The method further includes determining, by the one or more computing devices, a set of location constraints based at least in part on a predefined probability scheme associated with one or more attributes associated with a plurality of points of interest associated with the geographic information system. The method further includes identifying, by the one or more computing devices, a plurality of candidate points of interest from the plurality of points of interest, such that each candidate point of interest satisfies each constraint of the determined set of constraints. The method further includes selecting, by the one or more computing devices, a point of interest for presentation to a user from the plurality of candidate points of interest. The method further includes providing, by the one or more computing devices, data associated with the selected point of interest to a user device associated with the geographic information system.

Other example aspects of the present disclosure are directed to systems, apparatus, tangible, non-transitory computer-readable media, user interfaces, memory devices, and electronic devices for providing location data to users.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
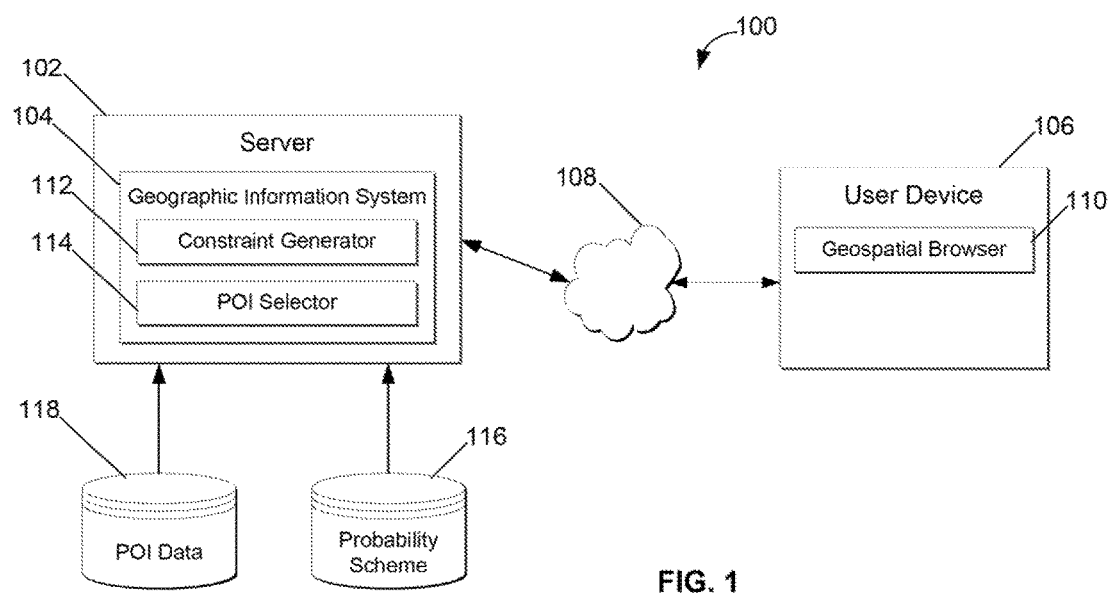
FIG. 1 depicts an overview of an example system for providing location data to a user according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to providing geographic location data to a user. For instance, a request for viewing location data for an unspecified point of interest (POI) within a user interface associated with a geographic information system (GIS) can be received. The user interface can be associated with a virtual mapping environment. A POI can be any suitable location, feature, entity, etc. associated with one or more locations. For instance, in some implementations, a POI may refer to a particular location such as a restaurant, landmark, etc. In some implementations, a POI may refer to a geographic area, such as a country, city, county, town, region, municipality, etc. The request can be a request to view information associated with a "randomly selected" (e.g. selected according to example aspects of the present disclosure in response to receiving the user request for the location data) POI. Upon receiving the request, a set of location constraints can be determined based at least in part on a predefined probability scheme associated with one or more attributes associated with a plurality of POIs. The set of constraints can define attribute values and/or attribute value ranges required to satisfy the set of constraints. A plurality of candidate POIs can be identified having attribute values that satisfy the set of constraints. A POI can be selected (e.g. uniformly selected at random) from the plurality of candidate POIs, and information associated with the selected POI can be provided to the user.

More particularly, the request for viewing location data can be made responsive to a user interaction with a POI selection user interface element within the virtual mapping environment. The virtual mapping environment can be implemented, for instance, on a user device associated with the user. The user device can be any suitable user device, such as a smartphone, tablet, wearable computing device, laptop, desktop, mobile device, device capable of being carried by a user while in operation, display with one or more processors, vehicle system, navigation system, or other user device. The virtual mapping environment can be configured to display visual content associated with a geographic area. In some implementations, the virtual mapping environment can include a representation of a three-dimensional body (e.g. globe, planet, geoid, or other spheroid). In this manner, the visual content can be associated with the representation of the three-dimensional body. Such virtual mapping environment can allow a user to navigate the representation of the three-dimensional body to view various suitable locations associated with the three-dimensional body.

The POI selection element can be displayed within the virtual mapping environment. The POI selection element can be configured to facilitate a provision of information associated with an unspecified, (e.g. non-predetermined) POI to the user. An unspecified POI can be a POI that is selected from a plurality of POIs subsequent to the user interaction with the POI selection element. For instance, the user can interact with the POI selection element of the virtual mapping environment as displayed by the user device. In this manner, the user interaction with the POI selection element can facilitate a selection of a POI from a plurality of POIs according to example aspects of the present disclosure, and a provision to the user of information associated with the selected POI.

In response to the user interaction, the user device can provide a request for location data to a remote computing device (e.g. server) associated with the virtual mapping environment. The server can be configured to determine a set of location constraints for selecting a POI. The location constraints can impose conditions that must be met by selected POI. The set of constraints can be determined using a probability scheme associated with one or more attributes of a plurality of points of interest. The plurality of POIs can include at least a subset of POIs stored in a POI database associated with the virtual mapping environment. Each POI in the plurality of POIs can have associated attribute data. The attribute data can specify one or more attributes, features, and/or characteristics associated with the POI. For instance, the attributes associated with the POIs can include a POI category attribute, a location attribute, a popularity attribute, and/or other suitable attribute. In some implementations, the attributes associated with the POIs can include one or more attributes associated with imagery depicting the POI. For instance, such imagery attributes can include attributes associated with a quality of such imagery, attributes associated with a date at which the imagery was captured, etc. Each attribute can have one or more associated attribute values. For instance, the attribute values for the POI category attribute can be a tourist attraction, geographical feature, historical location, business, restaurant, museum, theatre, landmark, country, city, county, neighborhood, district, or other suitable POI category. The attribute value for the location attribute can be, for instance, latitude and longitude coordinates of the POI. The attribute value for the popularity attribute can be a numerical or other representation of the popularity of the POI as determined by various suitable techniques. It will be appreciated that various other suitable attributes can be used having various other suitable attribute values.

The probability scheme can be a predefined probability scheme. In some implementations, the probability scheme can be set by the user, for instance, through an interaction with the virtual mapping environment. The probability scheme can assign probabilities to attribute values or value ranges for one or more attributes associated with the POIs. For instance, for the POI category attribute, the probability scheme can assign a probability of 50% to tourist attraction, 40% to geographical feature, and 10% to museum. For the popularity attribute, the probability scheme can assign a probability of 30% to a popularity score falling within a first popularity score range, and a probability of 70% to a popularity score falling within a second popularity score range. It will be appreciated that various other suitable probability schemes can be used.

The set of constraints can include one or more constraints that must be satisfied to be selected as the selected POI. The set of constraints can be determined based at least in part on the probability scheme. In particular, the set of constraints can be chosen randomly in accordance with the probabilities specified in the probability scheme. In this manner, the set of constraints can include attribute values and/or attribute value ranges for the one or more attributes. For instance, in continuing the above example, the set of constraints can be selected such that, for the POI category attribute, there is a 50% chance that the set of constraints will include a tourist attraction constraint, a 40% chance that the set of constraints will include a geographical feature constraint, and a 10% chance that the set of constraints will include a museum constraint. Further, the set of constraints can be selected such that, for the POI popularity attribute, there is a 30% chance that the set of constraints will include a constraint of a popularity score within the first range and a 70% chance that the set of constraints will include a constraint of a popularity score within the second range.

Once the set of constraints is determined, a plurality of candidate POIs can be identified that satisfy the set of constraints. For instance, at least a subset of the POIs stored within the POI database can be analyzed to determine a plurality of candidate POIs having attribute values that satisfy the set of constraints. In continuing the above example, if the determined set of constraints includes a tourist attraction constraint and a constraint of the first range of popularity scores, each candidate POI must be a tourist attraction having a popularity score within the first popularity score range (as specified by the attribute values associated with the candidate POIs). In some implementations, the set of constraints can be implemented as filters, such that the candidate POIs can include one or more POIs from the plurality of POIs that are not removed by the filters. For instance, each constraint of the set of constraints can be associated with a filter. The plurality of POIs in the POI database can be searched to identify the POIs that match the filters.

In some implementations, a threshold can be implemented for the candidate POIs. In such implementations, the threshold amount of candidate POIs can be identified. For instance, the plurality of POIs in the POI database can be analyzed until the threshold number of candidate POIs have been identified. Once the threshold is reached, the identification of the candidate POIs can cease.

Once the candidate POIs have been identified, one of the candidate POIs can be selected as a selected POI. Such POI can be selected, for instance, randomly from the candidate POIs, based on an order of the candidate POIs, and/or using various other suitable selection techniques. Upon a selection of the selected POI, contextual information associated with the selected POI can be retrieved, and presented to the user within the virtual mapping environment. Such contextual information can describe or explain one or more characteristics, facts, aspects, etc. associated with the selected POI. In some implementations, the virtual mapping environment can be configured to navigate to the selected POI, such that visual content representing the selected POI is provided for display within the virtual mapping environment. For instance, the visual content representing the selected POI can include two-dimensional and/or three-dimensional imagery depicting the selected POI and/or a geographic region in which the selected POI is located. For instance, the information associated with the selected POI can be displayed in conjunction with the visual content representing the selected POI within the virtual mapping environment.

As indicated, in some implementations, the set of constraints, and thereby the candidate POIs can be determined in response to a user request for location data (e.g. via user interaction with the POI selection interface element). In some implementations, the set of constraints and/or the candidate POIs can be determined prior to the user request. In this manner, upon a user request for location data, a POI can be selected from the predetermined candidate POIs. For instance, the selected POI can be selected at random, or based on a sequence of the candidate POIs. In such implementations, the predetermined candidate POIs can be stored at the server or on the user device.

Embodiments described herein enable users to expand the range of locations about which they can obtain information in the virtual mapping environment, without the user requiring prior knowledge of those locations. Embodiments can be contrasted with conventional methods, which specify purely random locations in the virtual mapping environment and which will frequently return results of little significance (for example, geographic coordinates that lie far from any real point of interest). When using such conventional methods, the user may be compelled to enter additional search criteria to refine the parameters of the search, so as to avoid being directed to locations of little geographic significance. Embodiments described herein can meanwhile ensure that the user is always presented with a genuine point of interest, without the need to specify such additional search criteria.

With reference now to the figures, example aspects of the present disclosure will be discussed in greater detail. For instance, FIG. 1 is directed to an overview of an example system 100 of providing location data to a user. The system 100 includes a server 102. The server 102 can host a geographic information system (GIS) 104. The server 102 can communicate with a user device 106, for instance, via a network 108. The user device 104 can be any suitable computing device, such as a desktop, laptop, smartphone, mobile device, tablet, wearable computing device, navigation system, display with one or more processors, etc. The GIS 104 can implement a mapping application, a virtual globe application, or any other suitable GIS. The GIS 104 can provide for the archiving, retrieving, and manipulation of geospatial data that has been indexed and stored according to geographic coordinates, such as latitude, longitude, and altitude coordinates, associated with the geospatial data. The GIS 104 can combine satellite imagery, photographs, maps, models, and other geographic data, and Internet search capability so as to enable a user to view imagery of the planet (e.g. as a portion of a virtual globe or other spheroid) and related geographic information (e.g., locales such as islands and cities, and points of interest such as local restaurants, hospitals, parks, hotels, and schools). The GIS 104 further allows the user to conduct local searches and/or to get travel directions to a location or between two locations. The user can virtually fly from space (e.g., some vantage point above the Earth) to and around an entered target address or location, such as a neighborhood or other area of interest. Results can be displayed in a three-dimensional representation of the area of interest. The user can pan, tilt, and rotate the view to see three-dimensional terrain and buildings.

The GIS 104 can further allow a user to annotate maps, and/or enable data layers to show, for example, parks, schools, hospitals, airports, shopping, and other points of interest or locales. The GIS 104 can further allow the user to layer multiple searches, save results to folders, and share search results and maps with others. An exemplary graphical user interface allowing the user to interact with the system will be discussed with reference to FIG. 2.

The user device 106 can include a geospatial browser 110 (or other suitable viewer) that acts as an interface between the user device 106 and the GIS 104. A user of the user device 106 can interact with the geospatial browser 110 to facilitate interactions between the user device 106 and the GIS 104. The geospatial browser can implement a user interface for viewing geographic data. The user interface can include a plurality of user interface elements with which the user can interact to facilitate communications between the user device 106 and the GIS 104.

According to example aspects of the present disclosure, the user interface can include a POI selection element that, when interacted with by the user, facilitates a selection of a POI from a plurality of POIs according to example embodiments of the present disclosure, and a provision of contextual information associated with the selected POI. In particular, in response to a user interaction with the POI selection element, the user device 106 can provide data indicative of the interaction to the GIS 104.

The GIS 104 can include a constraint generator 112 and a POI selector 114. The constraint generator 112 can be configured to determine a set of constraints to be used in the selection of a selected POI. The set of constraints can be determined based at least in part on a predefined probability scheme. In this manner, the GIS 104 can access a probability scheme 116 and use the probability scheme 116 in determining the set of constraints. The probability scheme 116 can specify probabilities associated with various attribute values for one or more attributes associated with the plurality of POIs. The plurality of POIs can be stored in a POI database 118. The POI database 118 can further store attribute data associated with the plurality of POIs. The attribute data can specify characteristics or attributes associated with the plurality of POIs. For instance, for a particular POI of the plurality of POIs, the attribute data can specify a category under which the POI falls, a location associated with the POI, a popularity of the POI, or other suitable characteristic of the POI.

Each attribute can have one or more associated possible attribute values. For instance, the possible attribute values for the POI category attribute can include various categories under which a POI may fall, such as tourist attraction, geographical feature, historical location, business, restaurant, museum, theatre, landmark, country, city, county, neighborhood, district, or other suitable category. In this manner, the POI category attribute value(s) for a particular POI can include one or more such categories. As another example, the possible attribute values for the POI location attribute can include geographic coordinate system values, such as latitude, longitude, and/or altitude values. In this manner, the POI location attribute value(s) associated with a particular POI can include one or more coordinate values representing a location of the POI. As yet another example, the possible attribute values for the POI popularity attribute can include possible popularity values. In this manner, the POI popularity attribute value(s) associated with a particular POI can include one or more values on a popularity score scale. As indicated, the popularity score can be a numerical or other representation indicative of the popularity of a POI.

The probability scheme can assign probabilities to one or more possible attribute values for one or more attributes. For instance, for a first attribute, the probability scheme can assign a first probability to a first attribute value, a second probability to a second attribute value, etc. In implementations wherein the attribute values associated with an attribute are numerical values (e.g. coordinate values, popularity score values, etc.), the probability scheme can assign probabilities to one or more attribute values and/or to one or more attribute value ranges. For instance, for such an attribute, the probability scheme can assign a first probability to a first value range, a second probability to a second value range, etc.

In this manner, the probability scheme can indicate one or more attributes to be accounted for in determining a set of constraints. As indicated, constraint generator 112 can determine the set of constraints based at least in part on the probability scheme 116. For instance, the constraint generator 112 can select the set of constraints randomly in accordance with the probabilities specified in the probability scheme. In this manner, constraints associated with one or more attributes can be determined based at least in part on the probabilities specified in probability scheme. The set of constraints can include one or more attribute values or value ranges associated with the one or more attributes to which probabilities are assigned in the probability scheme.

Upon a determination of the set of constraints, the POI selector 114 can be configured to select a POI to be presented to the user based at least in part on the constraints. In particular, the POI selector 114 can determine a plurality of candidate POIs based at least in part on the set of constraints. The plurality of candidate POIs can be selected from the POI database 118, and can include at least a subset of the plurality of POIs stored in the POI database 118. In particular, the POI selector 114 can search through the POI database 118 to determine one or more candidate POIs that satisfy the set of constraints. In this manner, each candidate POI can have associated attribute values that satisfy the set of constraints. For instance, the set of constraints can specify a POI category of geographical feature, a POI popularity within a first popularity score range, and/or a POI location within a first coordinate range. The POI selector 114 can search the POI database 118 to identify candidate POIs tagged as geographical features, having popularity scores within the first popularity score range, and having locations within the first coordinate range.

In some implementations, the POI selector can 114 can identify a threshold number of candidate POIs. For instance, the POI selector 114 can search the POI database 118 for candidates POIs until the threshold number of candidate POIs have been identified.

Once the plurality of candidate POIs have been identified, the POI selector 114 can determine a selected POI from the plurality of candidate POIs. For instance, the POI selector 114 can randomly select the selected POI from the plurality of candidate POIs.

Upon a selection of the selected POI, the GIS 104 can access mapping data associated with the selected POI. The mapping data can be stored in the POI database 118 or other suitable location, and can be data (e.g. satellite data, street-level photographs, aerial photographs, digital maps, elevation data, longitude/latitude data, GPS coordinates, etc.) for displaying imagery associated with the selected POI and/or a geographic area proximate the selected POI. The GIS 104 can further access contextual data associated with the selected POI. The contextual data can include relevant information associated with the selected POI, such as historical information, demographic information, interesting facts, geographical information, and/or any other suitable information that may be considered noteworthy or relevant associated with the selected POI. The server 102 can provide the mapping data and the contextual data to the user device 106. The geospatial browser 110 can render the data and can present the data in a suitable format within a user interface of the geospatial browser.

As indicated above, in some implementations, the candidate POIs can be predetermined (e.g. determined prior to a corresponding request for location data by a user) and stored locally on the user device 106. For instance, the plurality of candidate POIs can be determined by the GIS 104 according to example aspects of the present disclosure, and provided to the user device 106 independent of a request for location data by the user. In this manner, upon a request for location data by the user, the user device 104 can access the plurality of candidate POIs and can select one of the candidate POIs for presentation to the user. For instance, the user device 104 can select the POI randomly from the plurality of candidate POIs. The user device 106 can then request suitable mapping data and/or contextual data from the server 102, which can retrieve the requested data and provide the data to the user device 106 for rendering and presentation to the user.

Figure 2:
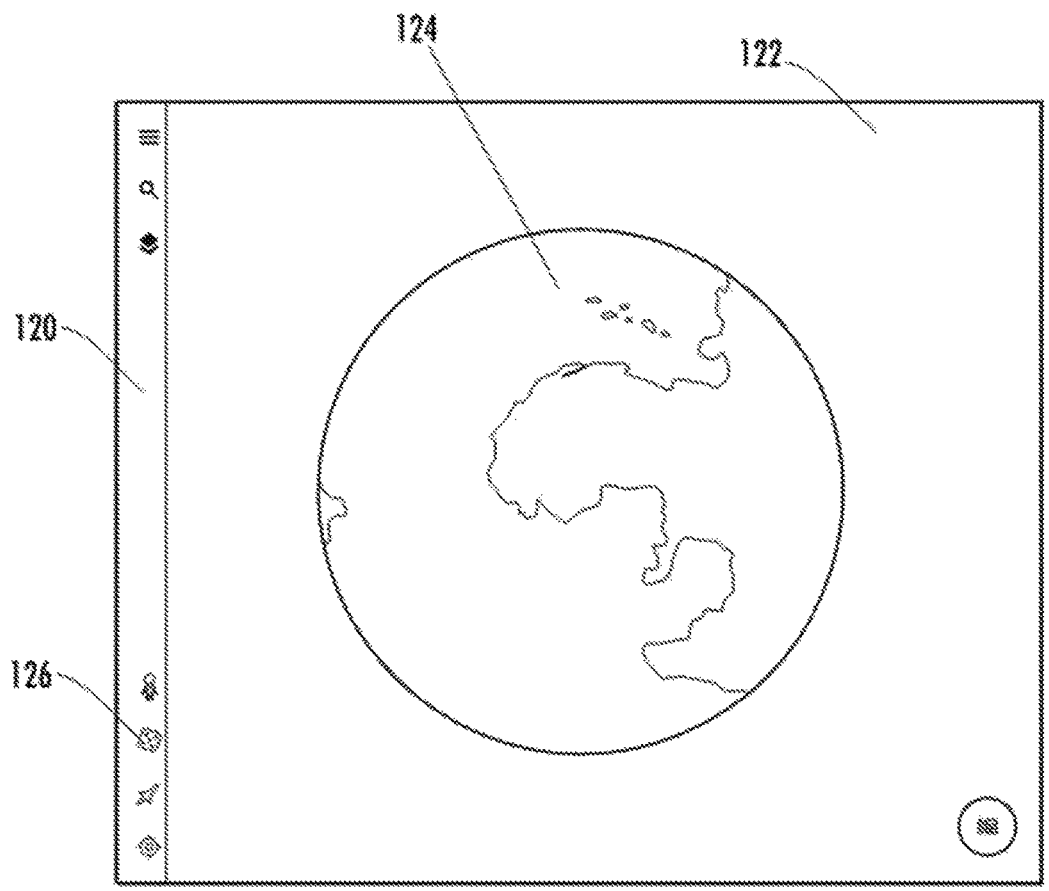
FIGS. 2 and 3 depict example user interfaces for providing location data to a user according to example embodiments of the present disclosure.
Figure 3:
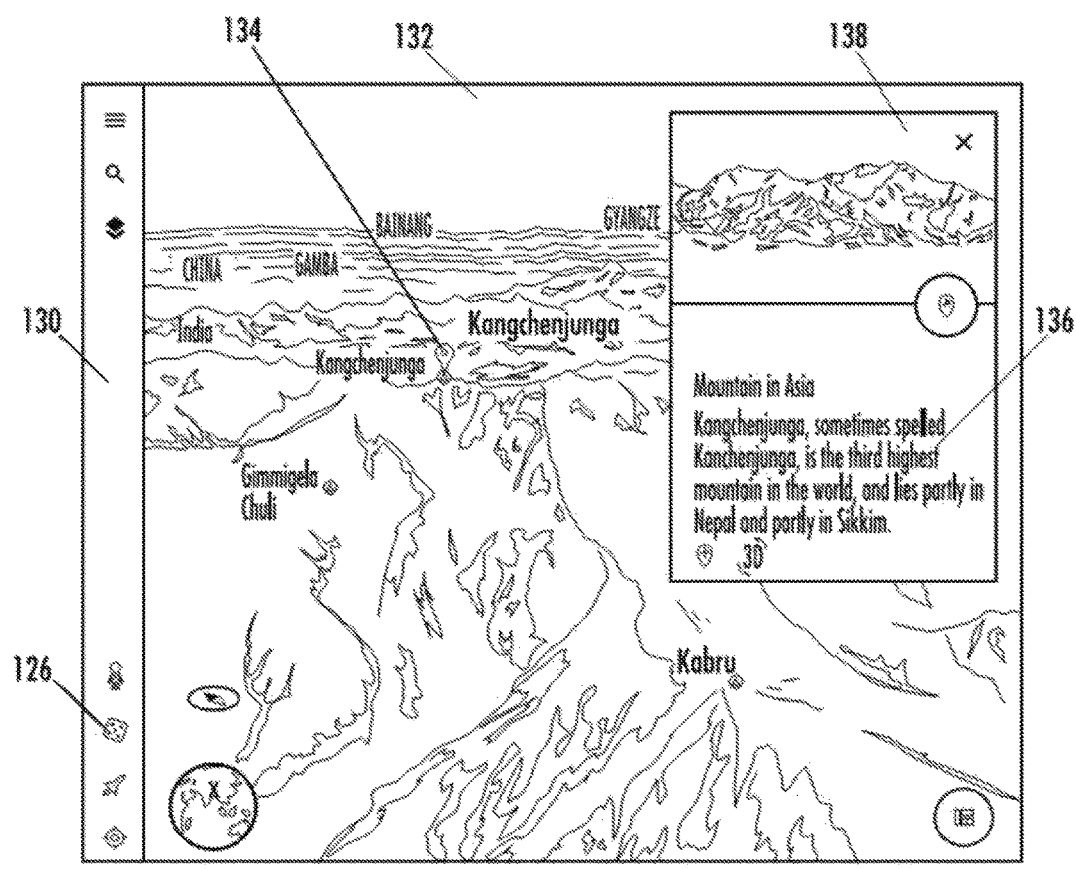

FIGS. 2 and 3 depict example user interfaces for providing location data to a user according to example embodiments of the present disclosure. In particular, FIG. 2 depicts example user interface 120. The user interface 120 includes a display area 122 for presenting visual content. As shown in FIG. 2, the user interface 120 includes a three-dimensional representation of a virtual globe 124 displayed within the display area 122. The user interface 120 can be an interactive user interface, and can allow a user to pan, tilt, rotate, and/or zoom with respect to the virtual globe 124. The user interface 120 can be displayed, for instance, within a geospatial browser by a user device, such as user device 106 depicted in FIG. 1. The user device 102 can generate the virtual globe 124 using various suitable rendering techniques. For instance, the user device 102 can receive mapping data associated with the virtual globe 124 from a GIS, such as GIS 104 depicted in FIG. 1. In some implementations, the mapping data can include vector data, raster data partitioned into "tiles" of a fixed size, a combination of vector data and raster data, and/or any other suitable data format. Moreover, the mapping data can allow for generating a two-dimensional map or a three-dimensional map (e.g., vertices defining a mesh and textures). A software application operating on the user device 104, such as the geospatial browser 110 or software application associated with the geospatial browser 110, can render and display the user interface 120.

The user interface 120 further includes a plurality of user interface elements that can allow a user to interact with the user interface 120. For instance, the user interface elements can include a search element allowing a user to search for a particular point of interest, location etc., a layers element allowing the user to select and view various mapping layers associated with one or more locations of the virtual globe 124, a zoom element allowing the user to adjust a zoom level at which the virtual globe 124 is displayed, and/or various other suitable user interface elements.

According to example aspects of the present disclosure, the user interface 120 further includes a POI selection element 126. The POI selection element 126 can facilitate a selection of a "random" POI according to example aspects of the present disclosure. In particular, in response to a user interaction with the POI selection element 126, a POI can be selected, and information associated with the selected POI can be presented to the user within the user interface 120. For instance, in some implementations, the user device 106 can cause the virtual globe 124 to automatically navigate or pan to the selected POI, and to display imagery associated with the selected POI.

FIG. 3 depicts an example user interface 130 according to example embodiments of the present disclosure. Similar to user interface 120, user interface 130 includes a display area 132 and a plurality of user interface elements including the POI selection element 126. Display area 132 presents imagery associated with a selected POI. As shown in FIG. 3, the user interface 130 displays imagery associated with a selected POI of Kangchenjunga, a mountain in Asia, within the display area 132. The user interface 130 includes a POI marker 134 positioned at a location of the selected POI. The user interface 130 further includes contextual information 136 associated with the selected POI. For instance, as shown in FIG. 3, the contextual information 136 is displayed within a contextual information window 138 overlaying the display area 132.

In this manner, upon a user interaction with the POI selection element 126, the user device 106 can provide data indicative of a request for location data to the server 102, and can receive mapping and/or contextual data associated with a selected POI, from the server 102. In response to receiving the mapping data and/or the contextual data, the user device 102 can display the user interface 130, or other user interface depicting imagery of a selected POI.

It will be appreciated that user interfaces 120 and 130 are depicted for illustrative purposes only. In particular, it will be appreciated that various other suitable user interfaces suitable for displaying various suitable geographic imagery can be used without deviating from the scope of the present disclosure.

Figure 4:
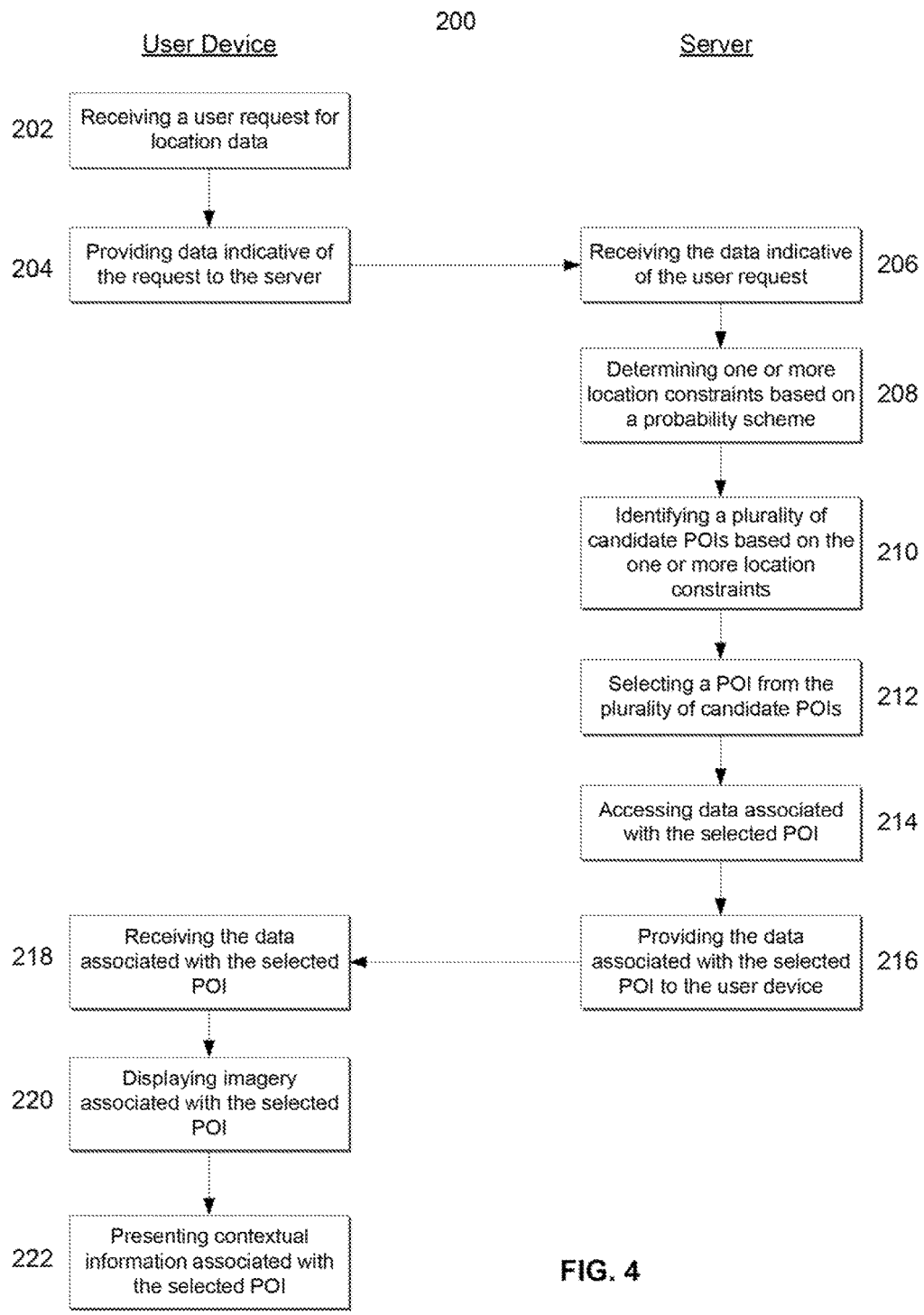
FIG. 4 depicts a flow diagram of an example method of providing location data to a user according to example embodiments of the present disclosure.

FIG. 4 depicts a flow diagram of an example method (200) of providing location data to a user according to example embodiments of the present disclosure. Method (200) can be implemented by one or more computing devices, such as one or more of the computing devices depicted in FIG. 6. In particular, method (200) can be performed using a client-server architecture wherein a user device communicates with a server. In addition, FIG. 4 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (202), method (200) can include receiving, by a user device, a request from a user for location data. In particular, the request for location data can be a request to view imagery and/or contextual information associated with a "randomly selected" POI. The request can be performed via an interaction by the user with a POI selection element displayed in a user interface of a geospatial browser configured to display geographic imagery. It will be appreciated that the user request can be performed using various other suitable input techniques, such as text entry, voice command, etc. At (204), method (200) can include providing, by the user device, data indicative of the request to a server hosting a geographic information system. The data indicative of the request can include a request for the server to select a POI according to example aspects of the present disclosure, and to provide data associated with the selected POI back to the user device.

At (206), method (200) can include receiving, by the server, the data indicative of the user request. At (208), method (200) can include determining, by the server, one or more location constraints based at least in part on a probability scheme. The location constraints can specify one or more criteria that must be satisfied by a POI to be selected as a candidate POI for presentation to the user. As indicated, the probability scheme can assign probabilities to one or more attribute values for one or more attributes associated with a plurality of POIs. In this manner, for each of the one or more attributes, the probability scheme can assign probabilities for percentages to the one or more attribute values, such that the probabilities or percentages are to be used in selecting the one or more location constraints. In this manner, the one or more location constraints can be determined in accordance with the probability scheme. In this manner, the location constraints can correspond to attribute values that must be possessed by a POI for the POI to be selected as a candidate POI.

At (210), method (200) can include identifying, by the server, a plurality of candidate POIs based at least in part on the one or more location constraints. In particular, identifying the plurality of candidate POIs can include analyzing at least a subset of a plurality of POIs, for instance, stored in a POI database associated with a GIS, and identifying the POIs from the at least a subset that satisfy the criteria specified by the location constraints. In this manner, the attributes and/or attribute values for each of the at least a subset of POIs can be analyzed to determine whether the POIs satisfy the criteria.

In some implementations, the plurality of POIs can be analyzed to identify the candidate POIs until a threshold number of candidate POIs have been identified. Upon a determination of the threshold number, the candidate POI identification can cease.

At (212), method (200) can include selecting, by the server, a POI from the plurality of candidate POIs. The selected POI can be selected using any suitable selection technique. For instance, in some implementations, the selected POI can be selected in a sequential manner based on an order of the candidate POIs. In some implementations, the selected POI can be selected randomly from the candidate POIs.

At (214), method (200) can include accessing, by the server, data associated with the selected POI. For instance, the data can include mapping data suitable for displaying imagery by the user device and/or contextual data specifying relevant, interesting, and/or noteworthy information associated with the selected POI. The server can access data from one or more databases associated with a GIS, such as the GIS 104 described with regard to FIG. 1. At (216), method (200) can include providing, by the server, the data associated with the selected POI to the user device.

At (218), method (200) can include receiving, by the user device, the data associated with the selected POI. At (220), method (200) can include displaying, by the user device, imagery associated with the selected POI. The imagery can include map imagery, satellite imagery, aerial imagery, interactive panoramic imagery, and/or other suitable imagery associated with the selected POI. In some implementations, the imagery can be associated with an interactive three-dimensional representation of the selected POI and/or a geographic area associated with the selected POI. At (222), method (200) can include presenting the contextual information associated with the selected POI within the user interface.

Figure 5:
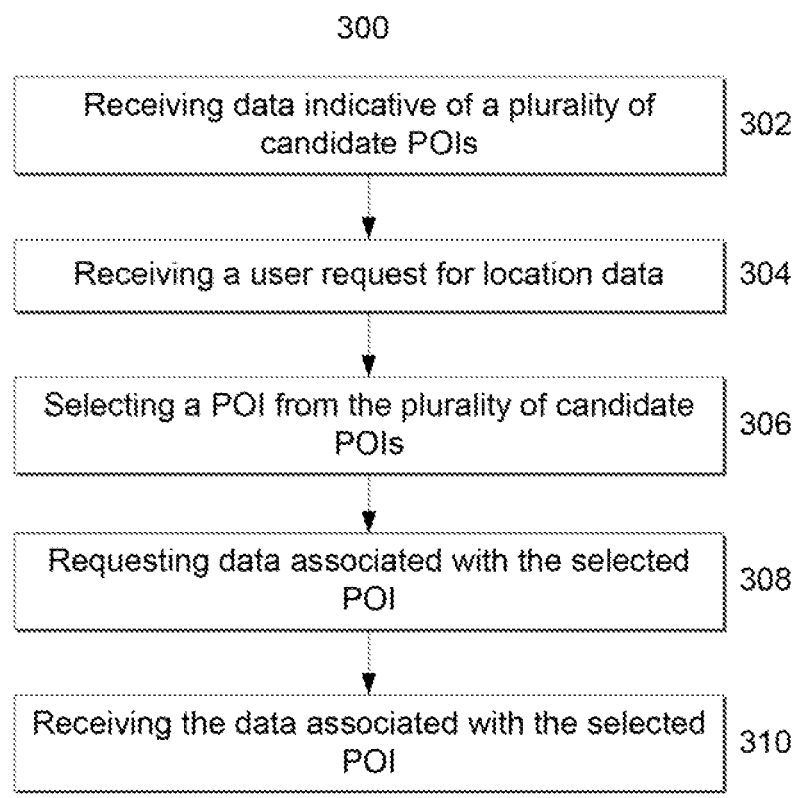
FIG. 5 depicts a flow diagram of an example method of providing location data to a user according to example embodiments of the present disclosure.

As indicated above, in some implementations, the plurality of candidate POIs can be determined independent of and/or prior to a request for location data by the user. In such implementations, the user device can locally store a list of the candidate POIs, and can select a POI from the list in response to a user request. For instance, FIG. 5 depicts a flow diagram of an example method (300) of providing location data to a user according to example embodiments of the present disclosure. Method (300) can be implemented by one or more computing devices, such as one or more of the computing devices depicted in FIG. 6. In particular implementations, method (300) can be performed by the user device 106 depicted in FIG. 1. In addition, FIG. 5 depicts steps performed in a particular order for purposes of illustration and discussion.

At (302), method (300) can include receiving data indicative of a plurality candidate POIs. The plurality of candidate POIs can be determined, for instance, by a server according to example aspects of the present disclosure. For instance, the plurality of candidate POIs can be selected based at least in part on one or more location constraints that were determined based at least in part on a predefined probability scheme.

At (304), method (300) can include receiving a user request for location data. The request for location data can be a request from the user to view imagery and/or contextual information associated with a "randomly selected" POI. At (306), method (300) can include selecting a POI based at least in part on the data indicative of the plurality of candidate POIs.

At (306), method (300) can include requesting data (e.g. mapping data, contextual data, etc.) associated with the particular selected POI from a server. As indicated, the requested data can be data suitable for displaying imagery and/or contextual information associated with the selected POI within a suitable user interface. At (308), method (300) can include receiving the requested data associated with the selected POI.

Figure 6:
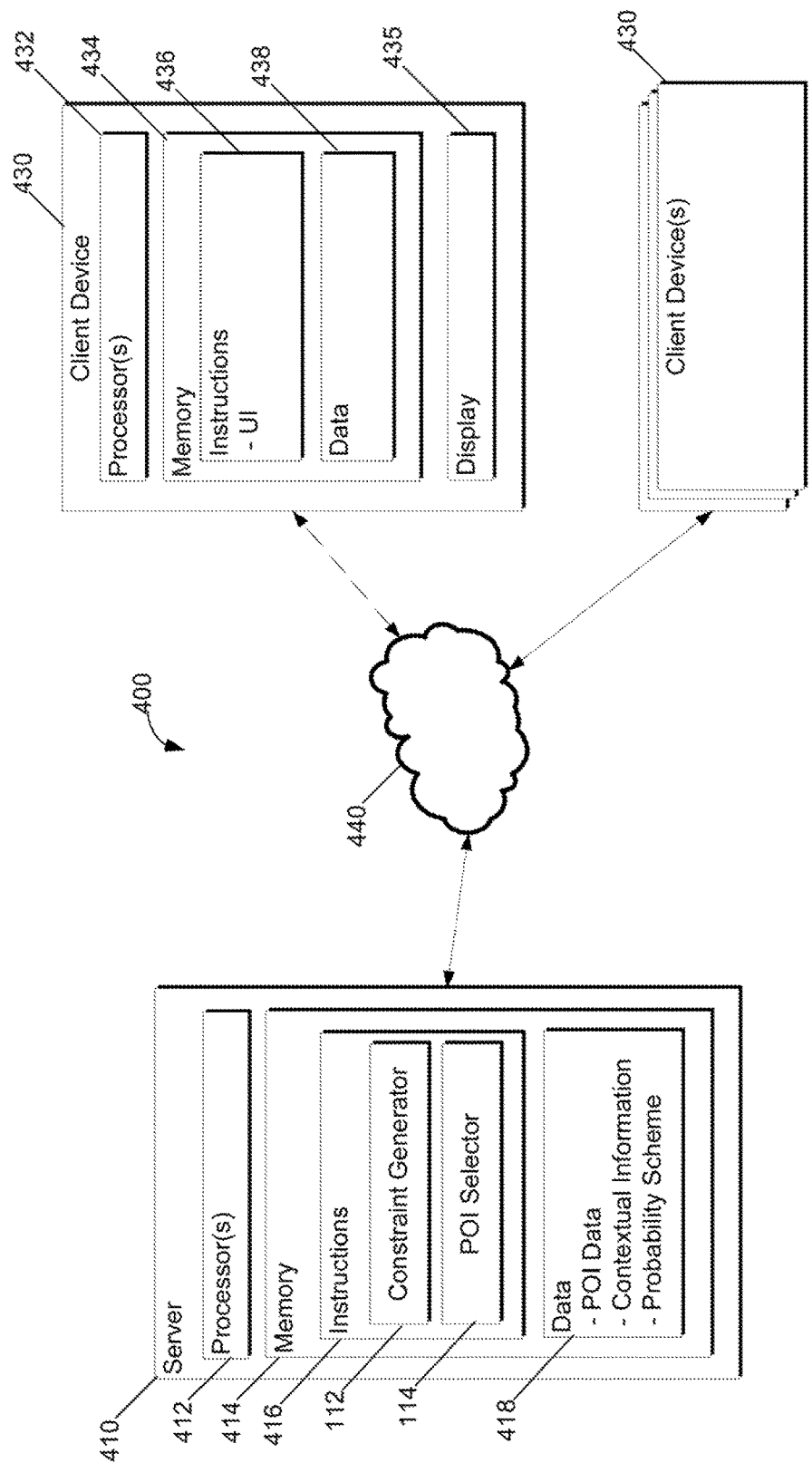
FIG. 6 depicts an example system according to example embodiments of the present disclosure.

FIG. 6 depicts an example computing system 400 that can be used to implement the methods and systems according to example aspects of the present disclosure. The system 400 can be implemented using a client-server architecture that includes a server 410 that communicates with one or more client devices 430 over a network 440. The system 400 can be implemented using other suitable architectures, such as a single computing device.

The system 400 includes a server 410, such as a web server. The server 410 can correspond to the server 102 depicted in FIG. 1 or other suitable server. The server 410 can host a geographic information system, such as a geographic information system associated with a mapping service, a virtual globe, and/or other suitable application. The server 410 can be implemented using any suitable computing device(s). The server 410 can have one or more processors 412 and one or more memory devices 414. The server 410 can also include a network interface used to communicate with one or more client devices 430 over the network 440. The network interface can include any suitable components for interfacing with one more networks, including for example, transmitters, receivers, ports, controllers, antennas, or other suitable components.

The one or more processors 412 can include any suitable processing device, such as a microprocessor, microcontroller, integrated circuit, logic device, or other suitable processing device. The one or more memory devices 414 can include one or more computer-readable media, including, but not limited to, non-transitory computer-readable media, RAM, ROM, hard drives, flash drives, or other memory devices. The one or more memory devices 414 can store information accessible by the one or more processors 412, including computer-readable instructions 416 that can be executed by the one or more processors 412. The instructions 416 can be any set of instructions that when executed by the one or more processors 412, cause the one or more processors 412 to perform operations. For instance, the instructions 416 can be executed by the one or more processors 412 to implement a constraint generator 112 and a POI selector 114 described with reference to FIG. 1.

As shown in FIG. 6, the one or more memory devices 414 can also store data 418 that can be retrieved, manipulated, created, or stored by the one or more processors 412. The data 418 can include, for instance, POI data, and other data. The data 418 can be stored in one or more databases. The one or more databases can be connected to the server 410 by a high bandwidth LAN or WAN, or can also be connected to server 410 through network 440. The one or more databases can be split up so that they are located in multiple locales.

The server 410 can exchange data with one or more client devices 430 over the network 440. Although two client devices 430 are illustrated in FIG. 6, any number of client devices 430 can be connected to the server 410 over the network 440. Each of the client devices 430 can be any suitable type of computing device, such as a general purpose computer, special purpose computer, laptop, desktop, mobile device, navigation system, smartphone, tablet, wearable computing device, a display with one or more processors, or other suitable computing device.

The client device(s) 430 can correspond to the user device 106 depicted in FIG. 1. Similar to the server 410, a client device 430 can include one or more processor(s) 432 and a memory 434. The one or more processor(s) 432 can include one or more central processing units (CPUs), graphics processing units (GPUs) dedicated to efficiently rendering images or performing other specialized calculations, and/or other processing devices. The memory 434 can include one or more computer-readable media and can store information accessible by the one or more processors 432, including instructions 436 that can be executed by the one or more processors 432 and data 438. For instance, the memory 434 can store instructions 436 for implementing a user interface for displaying geographic imagery, such as the user interface 120 and/or the user interface 130 depicted in FIGS. 2 and 3, respectively.

The client device 430 of FIG. 6 can include various input/output devices for providing and receiving information from a user, such as a touch screen, touch pad, data entry keys, speakers, and/or a microphone suitable for voice recognition. For instance, the client device 430 can have a display device 435 for presenting a user interface for displaying geographic imagery, such as the user interface 120 and/or the user interface 130 depicted in FIGS. 2 and 3, respectively.

The client device 430 can also include a network interface used to communicate with one or more remote computing devices (e.g. server 410) over the network 440. The network interface can include any suitable components for interfacing with one more networks, including for example, transmitters, receivers, ports, controllers, antennas, or other suitable components.

The network 440 can be any type of communications network, such as a local area network (e.g. intranet), wide area network (e.g. Internet), cellular network, or some combination thereof. The network 440 can also include a direct connection between a client device 430 and the server 410. In general, communication between the server 410 and a client device 430 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL). The network 440 can correspond to the network 108 depicted in FIG. 1

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of determining geographic location data, the method comprising:

responsive to user interaction with a point-of-interest-selection element of a virtual-mapping environment, receiving, by one or more computing devices and from a user device, data indicative of a request to view information associated with an unspecified point of interest within a geographic information system, the unspecified point of interest comprising a point of interest selected, from a plurality of points of interest associated with the geographic information system, subsequent to the user interaction;

determining, by the one or more computing devices and based at least in part on a predefined probability scheme associated with the plurality of points of interest, a set of location constraints;

identifying, by the one or more computing devices and from the plurality of points of interest, a plurality of candidate points of interest that each satisfy each constraint of the set of location constraints;

selecting, by the one or more computing devices and from the plurality of candidate points of interest, the point of interest; and providing, by the one or more computing devices and to the user device for presentation within the virtual-mapping environment, data associated with the point of interest.

2. The computer-implemented method of claim 1, wherein each point of interest of the plurality of points of interest has one or more associated attributes, and wherein each attribute of the one or more associated attributes has one or more attribute values.

3. The computer-implemented method of claim 2, wherein, for each point of interest of the plurality of points of interest, the predefined probability scheme comprises, for each attribute of the one or more associated attributes, a probability assigned to the one or more attribute values.

4. The computer-implemented method of claim 2, wherein determining the set of location constraints comprises determining the set of location constraints based at least in part on, for each point of interest of the plurality of points of interest, probabilities assigned, for each attribute of the one or more associated attributes, to the one or more attribute values.

5. The computer-implemented method of claim 1, wherein determining the set of location constraints comprises determining the set of location constraints in response to receiving the data indicative of the request.

6. The computer-implemented method of claim 1, wherein determining the set of location constraints comprises determining the set of location constraints prior to receiving the data indicative of the request.

7. The computer-implemented method of claim 1, wherein the data associated with the point of interest comprises mapping data associated with the point of interest.

8. The computer-implemented method of claim 1, wherein the data associated with the point of interest comprises data indicative of contextual information associated with the point of interest.

9. The computer-implemented method of claim 1, wherein selecting the point of interest comprises randomly selecting the point of interest from the plurality of points of interest.

10. The computer-implemented method of claim 1, wherein the geographic information system is configured to display visual content associated with at least a portion of a representation of a three-dimensional body.

11. A system comprising:

one or more processors: and a memory storing instructions that when executed by the one or more processors cause the system to perform operations comprising:

responsive to user interaction with a point-of-interest-selection element of a virtual-mapping environment, receiving, from a user device, data indicative of a request to view information associated with an unspecified point of interest within a geographic information system, the unspecified point of interest comprising a point of interest selected, from a plurality of points of interest associated with the geographic information system, subsequent to the user interaction;

determining, based at least in part on a predefined probability scheme associated with the plurality of points of interest, a set of location constraints;

identifying, from the plurality of points of interest, a plurality of candidate points of interest that each satisfy each constraint of the set of location constraints;

selecting, from the plurality of candidate points of interest, the point of interest; and providing, by the one or more computing devices and to the user device for presentation within the virtual-mapping environment, data associated with the point of interest.

12. The system of claim 11, wherein:

each point of interest of the plurality of points of interest has one or more associated attributes;

each attribute of the one or more associated attributes has one or more attribute values;

for each point of interest of the plurality of points of interest, the predefined probability scheme comprises, for each attribute of the one or more associated attributes, a probability assigned to the one or more attribute values; and determining the set of location constraints comprises determining the set of location constraints based at least in part on, for each point of interest of the plurality of points of interest, probabilities assigned, for each attribute of the one or more associated attributes, to the one or more attribute values.

13. The system of claim 11, wherein determining the set of location constraints comprises determining the set of location constraints in response to receiving the data indicative of the request.

14. The system of claim 11, wherein determining the set of location constraints comprises determining the set of location constraints prior to receiving the data indicative of the request.

15. The system of claim 11, wherein selecting the point of interest comprises randomly selecting the point of interest from the plurality of points of interest.

16. One or more non-transitory computer-readable media comprising instructions that when executed by one or more computers cause the one or more computers to perform operations comprising:

responsive to user interaction with a point-of-interest-selection element of a virtual-mapping environment, receiving, from a user device, data indicative of a request to view information associated with an unspecified point of interest within a geographic information system, the unspecified point of interest comprising a point of interest selected, from a plurality of points of interest associated with the geographic information system, subsequent to the user interaction;

determining, based at least in part on a predefined probability scheme associated with the plurality of points of interest, a set of location constraints;

identifying, from the plurality of points of interest, a plurality of candidate points of interest that each satisfy each constraint of the set of location constraints;

selecting, from the plurality of candidate points of interest, the point of interest; and providing, by the one or more computing devices and to the user device for presentation within the virtual-mapping environment, data associated with the point of interest.

17. The one or more non-transitory computer-readable media of claim 16, wherein:

each point of interest of the plurality of points of interest has one or more associated attributes;

each attribute of the one or more associated attributes has one or more attribute values;

for each point of interest of the plurality of points of interest, the predefined probability scheme comprises, for each attribute of the one or more associated attributes, a probability assigned to the one or more attribute values; and determining the set of location constraints comprises determining the set of location constraints based at least in part on, for each point of interest of the plurality of points of interest, probabilities assigned, for each attribute of the one or more associated attributes, to the one or more attribute values.

18. The one or more non-transitory computer-readable media of claim 16, wherein determining the set of location constraints comprises determining the set of location constraints in response to receiving the data indicative of the request.

19. The one or more non-transitory compute readable media of claim 16, wherein determining the set of location constraints comprises determining the set of location constraints prior to receiving the data indicative of the request.

20. The one or more non-transitory computer-readable media of claim 16, wherein selecting the point of interest comprises randomly selecting the point of interest from the plurality of points of interest.

* * * * *